A. T. STILL.

Improvement in Churn Dashers.

No. 122,075.  Patented Dec. 19, 1871.

Witnesses:
P. C. Gueterrel.
Frances McArdle.

Inventor:
Andrew T. Still.
PER
Attorneys.

AM. PHOTO-LITHOGRAPHIC CO. N.Y. (OSBORNE'S PROCESS)

UNITED STATES PATENT OFFICE.

ANDREW T. STILL, OF BALDWIN CITY, KANSAS.

IMPROVEMENT IN CHURN-DASHERS.

Specification forming part of Letters Patent No. 122,075, dated December 19, 1871.

*To all whom it may concern:*

Be it known that I, ANDREW T. STILL, of Baldwin City, in the county of Douglas and State of Kansas, have invented a new and useful Improvement in Churn-Dasher; and I do hereby declare that the following is a full, clear, and exact description thereof, which will enable others skilled in the art to make and use the same, reference being had to the accompanying drawing forming part of this specification, in which—

Figure 1:
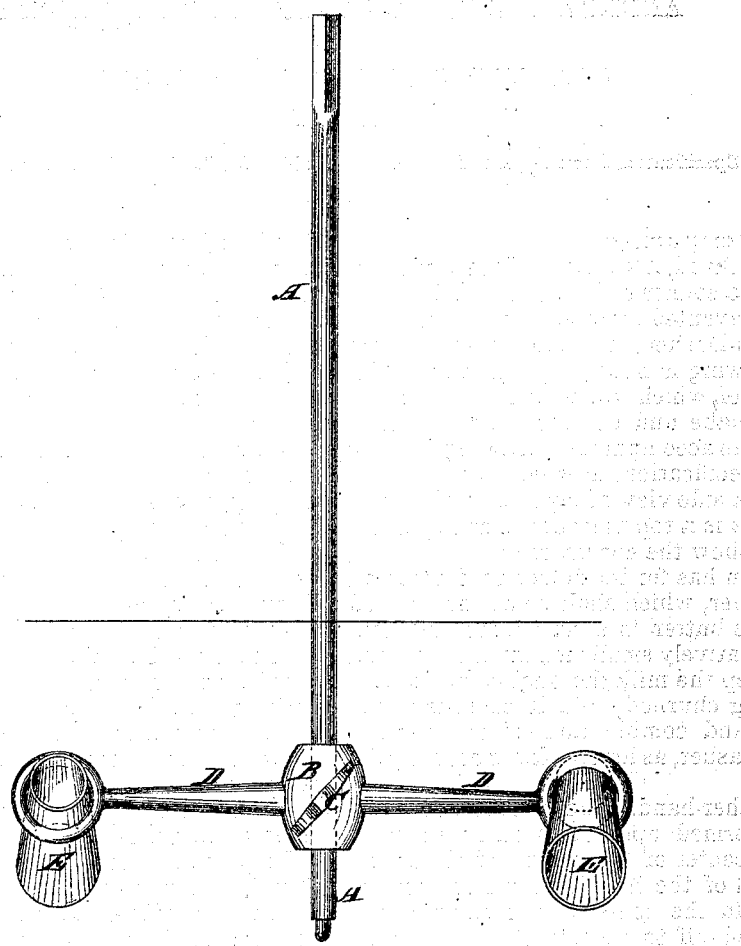
Figure 2:
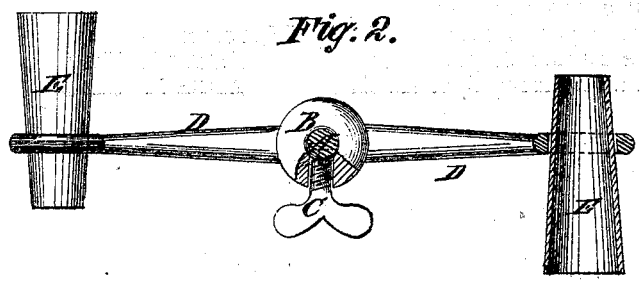

Figure 1 is a side view of my improved churn-dasher. Fig. 2 is a top view of the same, partly in section, to show the construction.

My invention has for its object to furnish an improved dasher, which shall be so constructed as to bring the butter in a very short time, and with a comparatively small amount of labor, and which will keep the milk thoroughly mixed with air while being churned; and it consists in the construction and combination of the various parts of the dasher, as hereinafter more fully described.

A is the dasher-handle, the lower end of which has a pivot formed upon it to enter a step or socket in the center of the bottom of the churn. The upper end of the handle A passes through and revolves in the center of the churn-cover, and is squared off to receive the gearing by which it is revolved, and which should be so constructed as to give the dasher a velocity of about eight hundred revolutions per minute. B is a hub, through which the handle A passes, and which is provided with a set-screw, C, to enable it to be adjustably secured in place. To the hub B are attached, or upon it are formed two or more radial arms, D, having holes or loops formed in their outer ends to receive tubes E. The tubes E are made tapering, as shown in Figs. 1 and 2, and are arranged with their larger ends forward and inclined downward, as shown in Fig. 1. The tubes E may be permanently or detachably secured in the holes in the arms D. To adjust the dasher for use, the arms D are so adjusted that the larger ends of the tubes E may dip into the milk so as to be partially beneath its surface.

With this adjustment, as the dasher is revolved, the milk will be forced through the tubes E, and will be projected upward by the inclination of the said tubes, and at the same time projected outward by the centrifugal force engendered by the revolution of the dasher, so as to dash against the sides of the churn, thus throwing the milk into violent agitation, thoroughly mixing it with the air, and bringing the butter in a very short time.

Having thus described my invention, I claim as new and desire to secure by Letters Patent—

The combination of the adjustable radial arms D and inclined tapering tubes E with the pivoted dasher-handle A, substantially as herein shown and described, and for the purpose set forth.

ANDREW T. STILL.

Witnesses:
JAMES B. HILL,
ANNA M. HILL.

(45)